(12) United States Patent
Moore et al.

(10) Patent No.: US 8,039,055 B2
(45) Date of Patent: Oct. 18, 2011

(54) METHOD TO INCREASE THE EFFICIENCY OF POLYMER DRAG REDUCTION FOR MARINE AND INDUSTRIAL APPLICATIONS

(75) Inventors: Kenneth J. Moore, Great Falls, VA (US); Thomas D. Ryan, Jenson Beach, FL (US); Christopher M. Moore, Arlington, VA (US); Timothy A. Boyce, Centreville, VA (US)

(73) Assignee: Cortana Corporation, Falls Church, VA (US)

(*) Notice: Subject to any disclaimer, the term of this patent is extended or adjusted under 35 U.S.C. 154(b) by 960 days.

(21) Appl. No.: 11/968,573

(22) Filed: Jan. 2, 2008

(65) Prior Publication Data

US 2008/0254226 A1 Oct. 16, 2008

Related U.S. Application Data

(63) Continuation-in-part of application No. 11/878,014, filed on Jul. 20, 2007, now abandoned.

(60) Provisional application No. 60/831,923, filed on Jul. 20, 2006.

(51) Int. Cl.
*B05D 5/00* (2006.01)
*B63B 1/34* (2006.01)
(52) U.S. Cl. ..................... 427/256; 114/67 A; 114/67 R
(58) Field of Classification Search .............. 114/67 R, 114/67 A
See application file for complete search history.

(56) References Cited

U.S. PATENT DOCUMENTS

| | | | |
|---|---|---|---|
| 3,161,385 A * | 12/1964 | Kramer | |
| 3,585,953 A * | 6/1971 | Kramer | |
| 3,973,510 A | 8/1976 | McCulloch et al. | |
| 4,186,679 A * | 2/1980 | Fabula et al. | 114/20.1 |
| 4,518,638 A | 5/1985 | Rasmussen | |
| 4,585,810 A * | 4/1986 | Bock et al. | |
| 5,320,309 A * | 6/1994 | Nosenchuck et al. | |
| 5,437,421 A * | 8/1995 | Nosenchuck et al. | |
| 5,488,076 A * | 1/1996 | Supco et al. | |
| 6,357,374 B1 * | 3/2002 | Moore et al. | |
| 6,435,214 B2 * | 8/2002 | Babenko | |
| 6,516,652 B1 * | 2/2003 | May et al. | |
| 6,520,455 B2 * | 2/2003 | Karniadakis et al. | |
| 7,256,224 B2 * | 8/2007 | Martin et al. | |
| 2002/0045703 A1 * | 4/2002 | Bassett et al. | |
| 2002/0106454 A1 * | 8/2002 | Trippe et al. | |
| 2003/0065055 A1 * | 4/2003 | Johnston et al. | |
| 2003/0187123 A1 * | 10/2003 | Labude et al. | |
| 2004/0000265 A1 * | 1/2004 | Carson | 114/67 R |
| 2004/0126541 A1 * | 7/2004 | Dietz et al. | |
| 2007/0184275 A1 * | 8/2007 | Gilman | |
| 2007/0205392 A1 * | 9/2007 | Martin | |
| 2007/0258940 A1 * | 11/2007 | Hamilton et al. | |

FOREIGN PATENT DOCUMENTS

| | | |
|---|---|---|
| EP | 1 736 516 A1 | 12/2006 |
| EP | 1736516 A | 12/2006 |
| GB | 2136708 A | 9/1984 |
| WO | 2004-072202 A | 8/2004 |
| WO | 2004/072202 A1 | 8/2004 |

OTHER PUBLICATIONS

P.J. Barham, Adsorption-entanglement layers in flowing high molecular weight polymer solutions: IV. The rates of layer formation and decay, Coll & Pol Sci, 264: 917-923, 1986.*
Barham, P. J., "A Quantitative Model for the Formation of Adsorption-entanglement Layers," *Colloid & Polymer Science*, 265(7): 584-591, 1987.
Barham, P., et al., "Adsorption-entanglement Layers in Flowing High Molecular Weight Polymer Solutions III. Solution Concentration and Solvent Power," *Colloid & Polymer Science*, 264(6): 515-521, 1986.
Biederman, Hynek (Editor), *Plasma Polymer Films*, Imperial College Press, London, pp. 237-239, 338-340, and 357-361, 2004.
Churaev, N. V., et al., "Hydrodynamic Thickness and Deformation of Adsorbed Layers of Polyethylene Oxides," *Journal of Colloid and Interface Science*, 169: 300-305, 1995.
Deutsch, S., et al., "Combined Polymer and Microbubble Drag Reduction on a Large Flat Plate," *Journal of Fluid Mechanics* 556: 309-327, 2006.
Dijt, J. C., et al., "Kinetics of Adsorption and Desorption of Polystyrene on Silica from Decalin," *Macromolecules*, 27: 3207-3218, 1994.
Frantz, P., et al., "Orientation of Adsorbed Polymer in Response to Shear Flow," Colloids and Surfaces A: Physicochemical and Engineering Aspects 86: 295-298, 1994.

(Continued)

*Primary Examiner* — Michael Cleveland
*Assistant Examiner* — James Mellott
(74) *Attorney, Agent, or Firm* — Arnold International; Bruce Y. Arnold

(57) ABSTRACT

A method for increasing the efficiency of additive drag reduction by establishing a drag-reducing viscoelastic coating on a surface. The method includes mixing a polymer into a concentrated solution that has approximately the same density as a fluid flowing over the surface, ejecting the mixture/solution into the flowing fluid in a manner such that a coating of polymer, which initially grows thicker with time, is adsorbed onto the surface, and reducing the ejection rate of the first fluid such that the coating of polymer then grows thinner with time. These steps may be repeated so that a desired minimum coating thickness is maintained over an extended period of time. The method reduces the polymer expenditure rate for a given drag reduction. Moreover, the produced viscoelastic coating impedes the attachment and growth of drag-producing natural organisms and may be applied without "downtime" (e.g., while underway).

4 Claims, No Drawings

OTHER PUBLICATIONS

Gyr, A., et al., "The Effect of Wall Absorption on the Toms Effect," *Chemical Engineering Science*, 29: 1057-1060, 1974.

Gyr, A., et al., *"Drag Reduction of Turbulent Flows by Additives,"* Kluwer Academic Publ., (ISBN 0-7923-3485-X), 27-32, 1995.

Hand, J. H., et al., "The Adsorbed-entangled Layer in Drag Reduction," *Chemical Engineering Science*, 28: 63-68, 1973.

Hansen, R. J., et al., "Fluid-property Effects on Flow-generated Waves on a Compliant Surface," *J. Fluid Mechanics*, v. 133, 161-177, 1983.

Harris, J. M., et al. (eds.), Poly(ethylene glycol) Chemistry and Biological Applications. ACS Symp. Ser 680, American Chemical Society, Washington, D.C., 352-358, 1997.

Hoyt, J. W. et al., "Frictional Resistance in Towing Tanks," Proc. $10^{th}$ International Towing Tank Conference, Teddington, 83-89, 1963.

Hoyt, J. W., "Drag Reduction by Polymers and Surfactants, in *Viscous Drag Reduction in Boundary Layers,*" edited by D M Bushnell and J N Hefner, vol. 123, 413-429, 1990.

Jones, et al., "Polymers at Surfaces and Interfaces," Cambridge University Press, 112-113, 1999.

Koury, E., et al., "Drag Reduction by Polymer Solutions in a Riblet-Lined Pipe," Applied Scientific Research, 54, 323-347, 1995.

Kowalski, T., "Turbulence Suppression and Viscous Drag Reduction by Non-Newtonian Additives," Transactions of the Royal Institution of Naval Architects. 207-219. 1968.

Lee, W. K., et al., "Turbulent Drag Reduction in Polymeric Solutions Containing Suspended Fibers," AI Ch E J., 20 (1), 128-133. Jan. 1974.

Merkle, C. L., et al., "Drag Reduction in Liquid Boundary Layers by Gas Injection," in *Viscous Drag* Reduction in Boundary Layers, edited by D M Bushnell, et al., vol. 123, 351-410, 1990.

Moore, K. J., et al., "Design and Test of a Polymer Drag Reduction System on Sea Flyer," presented at $26^{th}$ Symposium on Naval Hydrodynamics, Rome, Italy, Sep. 17-22, 2006.

Semenov, B. N., et al., "Combined Effect of Small Amounts of Polymers Added to a Flow and of Surface Pliability on Turbulent Friction," Seriya Tekhnichesikh Nauk: 89-94, 1984.

Sharma, R. S., et al., "Drag Reduction by Center-line Injection of Fibers in a Polymeric Solution," Chem Eng. J., 18, 73-79, 1979.

Vdovin, A. V., et al., "Diffusion of Polymer Solutions in a Turbulent Boundary Layer," *Journal of Applied Mechanics and Technical Physics*, 19(2): 196-201, 1978.

Vdovin, A. V., et al., "Turbulent Diffusion of Polymers in a Boundary Layer," *Journal of Applied Mechanics and Technical Physics*. 22 (4), 526-531, 1981.

Winkel, E. S., et al., "Friction Drag Reduction at High Reynolds Numbers with Wall Injected Polymer Solutions," 26th Symposium of Naval Hydrodynamics, Rome, Italy, 2006.

\* cited by examiner

METHOD TO INCREASE THE EFFICIENCY OF POLYMER DRAG REDUCTION FOR MARINE AND INDUSTRIAL APPLICATIONS

This is a continuation-in-part of U.S. application Ser. No. 11/878,014 filed Jul. 20, 2007, now abandoned which claimed the benefit of priority from U.S. Provisional Application No. 60/831,923, filed Jul. 20, 2006. This application claims the benefit of priority from each of those applications.

STATEMENT OF GOVERNMENT INTEREST

The invention described herein may be used by or for the U.S. Government for governmental purposes without the payment of any royalty thereon.

TECHNICAL FIELD

The potential of viscoelastic coatings to reduce drag has been the subject of research and a series of patents over the past 40 years in the United States, France, Japan, Ukraine, and Russia. The coatings may be used alone or in conjunction with other drag reduction techniques. The performance of such coatings has not been consistent; they are fragile, heavy, costly to install, and can increase drag when they fail. Because of their cost and complexity, their application has been considered only for high-value military ships. Further, the coatings are subject to marine fouling, which can degrade their performance and the performance of the vessel. Some coatings require electric, thermal, or pneumatic energy to adapt to the dynamics of a marine or industrial application. There is a need for an effective, easily maintained, and low-cost viscoelastic coating that is amenable to the demands of marine and industrial environments.

OBJECTIVES OF THE INVENTION

The objectives of the present invention are:

(1) to provide an effective drag-reducing viscoelastic coating system that can self-mend and tolerate the stress of marine/industrial environments;

(2) to provide a method to increase the efficacy of friction drag reduction techniques such as the well known "Toms Effect" [Toms, B. A., "Some Observations on the Flow of Linear Polymer Solutions through Straight Tubes at Large Reynolds Numbers," Proc. $1^{st}$ Intern. Congr. Rheol., Amsterdam, 11, 135-141, 1948];

(3) to enhance the favorable environmental impact of polymer drag reduction by further reducing the noxious emissions and carbon dioxide emissions from marine propulsion systems;

(4) to provide a regenerative anisotropic viscoelastic coating that, by itself, will reduce friction drag on the order of ten percent;

(5) to provide a means to inhibit biofouling and the concomitant "in-service" drag associated with operating in a marine environment;

(6) to provide a drag-reducing coating that does not require costly installation and redocking for maintenance and repair;

(7) to provide a coating that produces no degrading "edge effects";

(8) to provide a coating that will not produce surface deformations that extend above the viscous sublayer and thereby act as "dynamic" roughness elements, which increase drag;

(9) to provide a coating that, by its nature, is anisotropic in the direction of flow;

(10) to provide an ablative polymer coating that can be easily replenished while underway at sea or operating in an industrial environment; and

(11) to provide a viscoelastic surface that forms a fibrous or brush-like surface that will reduce the level of turbulence as has been demonstrated with ejected fibers in the flow and with microgrooved surfaces, which are termed riblets.

BACKGROUND ART

Interest in compliant coatings for marine vehicles dates to the mid-1960s, when Max O. Kramer studied compliant coatings as a means to reduce drag by extending the laminar flow region in a boundary layer [Kramer, M. O., "Means and Method for Stabilizing Laminar Boundary Layer Flow," U.S. Pat. No. 3,161,385, which issued 15 Dec. 1964; and Kramer, Max Otto, "Means and Method for Stabilizing Laminar Boundary Layer Flow," U.S. Pat. No. 3,585,953, which issued 22 Jun. 1971]. Kramer suggested that surface coatings that successfully mimic the skin of a dolphin had the potential to reduce the friction component of the drag of a marine vessel. A successful demonstration was conducted in Long Beach Harbor under the sponsorship of the U.S. Navy Office of Naval Research [Kramer, M. O., "Boundary Layer Control by 'Artificial Dolphin Coating'," *Naval Engineers Journal* 89(5): 41-45, 1977]. Since that time, there has been little success by U.S. researchers to duplicate that work. However, through the 1970s and 1980s, drag reduction work on coatings, sponsored by the Soviet Navy, was conducted primarily in Kiev, Ukraine and Novosibirsk, Russia. This work, pioneered by L. F. Kozlov and Victor V. Babenko, at the Institute of Hydromechanics in Kiev, Ukraine, produced a series of Soviet Inventors Certificates [Soviet Certificates 1413286, 1483538, 1597866, 1802672]. These Soviet efforts differ from Kramer's in that they are also intended to reduce the level of turbulence in the boundary layer rather than just extend the region of laminar flow. Some coatings were integrated with polymer additives to produce a system that was more effective than either technique alone. Babenko et al. were among the early researchers to recognize the potential of these viscoelastic coatings both alone and in combination with other techniques. The Kiev team was able to identify specific characteristics of a successful coating that had not been specified by Kramer in the details of his earlier effort. It became apparent from the design of these coatings that an important feature is anisotropy in the direction of flow.

Most of the viscoelastic coatings tested in the United States were not successful and some actually increased the drag. After Kramer, the approach of U.S. researchers was to try a range of available coating materials. Not until May and Voropayev [May, C. L. et al., "Design of Viscoelastic Coatings to Reduce Turbulent Friction Drag," U.S. Pat. No. 6,516,652 B1, which issued 11 Feb. 2003] was there an effort to carefully select the properties of the viscoelastic coating considering the parameters of the adjacent turbulent boundary layer. With this approach, unfavorable conditions that had plagued U.S. researchers, such as "static divergence," dynamic roughness, and waves on the coating traveling counter to the flow, [Hansen, R. J. and Hunston, D. L., "Fluid-property Effects on Flow-generated Waves on a Compliant Surface," *J. Fluid Mechanics*, v. 133, 161-177, 1983] were avoided. May and Voropayev taught that the material properties of the coating should be matched to adsorb the pulsations of the turbulent boundary layer normal to the surface and that the resulting response must be 90 degrees out of phase and in the direction of flow. Following that approach, they identified a number of characteristics necessary for a viscoelastic coating to be successful. First, they reiterated Babenko's teaching that the coating must be anisotropic in the direction of flow. Second, May and Voropayev also taught that any turbulence-generated deformations on the surface of the coating must not exceed the height of the viscous sublayer. Third, they taught that improperly formed transverse coating edges could result in the reflection of turbulence-produced waves in the coating (i.e., edge effects) that would degrade the effectiveness of the coating. Fourth, they taught that the coating density should be approximately the density of the fluid flowing over the coating.

Even when properly posed, the coatings are fragile and can rupture, thereby degrading their effectiveness. In general, the coatings were of sufficient complexity and high cost that their application apparently has been limited to military submarines. The coatings are usually on the order of one to ten centimeters thick, making them heavy and difficult to install. For these reasons, commercial application has yet to become practicable.

There are other categories of coatings that are commercially available and claim drag reduction [Gilman, Thomas H., "Methods of Applying a Hydrophilic Coating to a Substrate, and Substrates Having a Hydrophilic Coating," Pub. No. US 2007/0184275 A1 published 9 Aug. 2007, and Dietz, Timothy M. et al., "Drag Reduction Article and Method of Use," Pub. No. US 2004/0126541 A1 published 1 Jul. 2004], or the ability to inhibit marine fouling [Hamilton, Willard Chalson et al., "Hydrophilic Fouling-release Coatings and Uses Thereof," Pub. No. US 2007/0258940 A1 published 8 Nov. 2007], but these are not viscoelastic. Others include hydrophilic bottom coatings for boats, such as SEA-SLIDE™ and water ablative painted coatings that release polymer into the boundary layer [Supcoe et al., U.S. Pat. No. 5,488,076, which issued 30 Jan. 1996]. Also, adhesive-backed vinyl microgrooved surfaces (referred to as riblets), when clean of any fouling, are known to reduce drag. Such microgrooves order and stabilize the longitudinal flow structures near the surface. However, these coatings each perform only a single function (e.g., biofouling inhibition, polymer release, or provide a surface structure) and require special surface application when the hull is dry (i.e., out of the water). Thus, the vessel must be removed from service (i.e., drydocked) for re-application. More recently there have been a number of efforts to use emerging nanotechnology to produce turbulence-interactive surfaces in order to reduce friction drag [Karniadakis, George Em et al., "Method and Apparatus for Reducing Turbulent Drag," U.S. Pat. No. 6,520,455 B2, which issued 18 Feb. 2003; Nosenchuck, Daniel M. et al., "Electromagnetic Device and Method for Boundary Layer Control," U.S. Pat. No. 5,320,309, which issued 14 Jun. 1994; and Nosenchuck, Daniel M. et al., "Multiple Electromagnetic Tiles for Boundary Layer Control," U.S. Pat. No. 5,437,421, which issued 1 Aug. 1995], but these systems are complex, require advanced control systems, and can consume significant levels of energy.

Hence, there is a need for a simple, environment-tolerant, and cost-effective drag-reducing coating, which can be exploited so as to increase the performance and operational efficiency of vessels moving through water (as well as liquids moving through pipes or ducts) and can be applied without large maintenance expenses and/or drydock requirements.

Experimentally, friction reduction has been more reliably achieved by the introduction of additives into the boundary layer flow. The most common additives are aqueous solutions of long chain polymers [Hoyt, J. W. and Fabula, A. G., "Frictional Resistance in Towing Tanks," Proc. 10$^{th}$ Intern. Towing Tank Conf., Teddington, 1963; Hoyt, J. W., "Fluid-Flow Friction Reduction," NURDC, May 5, 1969; and Hoyt, J. W., "Drag Reduction by Polymers and Surfactants," in *Viscous Drag Reduction in Boundary Layers*, edited by D. M. Bushnell and J. N. Hefner, Vol. 123, 413-429, 1990]. A number of techniques have been developed to select, prepare, and stabilize polymer drag-reducing solutions [Bock, Jan et al., "Drag Reduction Agent," U.S. Pat. No. 4,585,810, which was issued 29 Apr. 1986; Labude, Katrina M. et al., "Drag-reducing Polymer Suspensions," Pub. No. US 2003/0187123 A1 published 2 Oct. 2003; Johnston, Ray L. et al., "Method for Manufacturing Drag-reducing Polymer Suspensions," Pub. No. US 2003/0065055 A1 published 3 Apr. 2003; Martin, Thomas J. et al., "Stabilized Polymer Drag Reducing Agent Slurries," U.S. Pat. No. 7,256,224 B2, which was issued 14 Aug. 2007; Martin, Thomas J., "Stabilized and Freeze-protected Polymer Drag Reducing Agent Suspensions," Pub. No. US 2007/0205392 A1 published 6 Sep. 2007; and Bassett, David Robinson et al., "Processes for Preparing Aqueous Polymer Emulsions," Pub. No. US 2002/0045703 A1 published 18 Apr. 2002]. Other techniques have been developed to enhance the coating property of polymers [Trippe, J. C. et al., "High Molecular Weight Polymer Additive for Coating and Protective Products," Pub. No. US 2002/0106454 A1 published 8 Aug. 2002], for the purpose of strengthening fibers and sealing surfaces as opposed to enhancing drag reduction.

Other drag-reducing additives include: surfactant-based solutions in which micelles have been formed [Gyr, A. and Bewersdorff, H. W., "Drag Reduction of Turbulent Flows by Additives," Kluwer Academic Publ., (ISBN 0-7923-3485-X), 1995]; fibrous materials such as asbestos or nylon [Lee, W. K. et al., "Turbulent Drag Reduction in Polymeric Solutions Containing Suspended Fibers," *AI Ch E J.*, 20 (1), 128-133, January 1974; and Sharma, R. S. et al., "Drag Reduction by Center-line Injection of Fibers in a Polymeric Solution," Chem. Eng. J., 18, 73-79, 1979], and small gas bubbles, referred to as "microbubbles" [Merkle, C. L. and Deutsch, S., "Drag Reduction in Liquid Boundary Layers by Gas Injection," in *Viscous Drag Reduction in Boundary Layers*, edited by D. M. Bushnell and J. N. Hefner, Vol. 123, 351-410, 1990]. While each of these techniques was successfully demonstrated in the laboratory, their practicability was limited by several factors. For microbubbles, the limitations relate to their migration away from the near-wall region of the boundary layer where they are effective as well as their coalescence into larger-scale bubbles, which are less effective in reducing drag. Except for a limited set of ejector geometries, polymers and other additives can be rapidly diffused away from the region where they are effective, thereby requiring very large expenditure rates to maintain effective levels of additive concentration near the wall [Vdovin, A. V. and Smol'yakov A. V., "Turbulent Diffusion of Polymers in a Boundary Layer," *Journal of Applied Mechanics and Technical Physics*, 22 (4), 526-531, 1981]. Also, the polymers had to be premixed and carried as a slurry to ensure they were properly mixed and hydrated. Because of the very high expenditure rates required with traditional ejection techniques [see, for example, Winkel, E. S. et al., "Friction Drag Reduction at High Reynolds Numbers with Wall Injected Polymer Solutions," 26th Symposium of Naval Hydrodynamics, Rome, Italy, 2006], large volumes of slurry are expected to be expended in a matter of hours and the application of polymers appeared to be limited to military vessels in which a quick burst of speed might be useful.

In addition to reducing friction drag when used separately, the ejection of fibers, such as asbestos or nylon, also enhance the performance of polymer ejection reduction [Lee, W. K. et al., "Turbulent Drag Reduction in Polymeric Solutions Containing Suspended Fibers," *AI Ch E J.*, 20 (1), 128-133, January 1974; and Sharma, R. S. et al., "Drag Reduction by Center-line Injection of Fibers in a Polymeric Solution," *Chem. Eng. J.*, 18, 73-79, 1979]. Lee et al. reported that the quantity of fibers, which alone produced about 15 percent reduction in friction drag, produced over 60 percent friction reduction when combined with the quantity of polymer that alone produced only about 36 percent skin friction reduction. Sharma et al. later confirmed the generality of the enhanced drag-reduction performance of combined polymer and fiber systems. The opportunity to exploit that synergism has been elusive because of limitations on marine and industrial applications of fibers. Such fibers are known to be hazardous to handle and most are considered to be long-term pollutants. On the other hand, microbubbles and polymers break down into air for the former and natural compounds such as carbon dioxide and water for the latter.

There are other examples of synergism between various drag-reducing techniques. For example, it has been known that the proper combination of polymer ejection and microbubble ejection, as with fibers and polymer, can produce higher levels of drag reduction than the sum of individual performance levels [Semenov, B. N. et al., "Combined Effect of Small Amounts of Polymers Added to a Flow and of Surface Pliability on Turbulent Friction," Seriya Tekhnichesikh Nauk: 89-94, 1984; Amirov, A. I. et al., "Experiments on Turbulent Drag Reduction by Joint Use of Compliant Coatings, Gas Microbubbles and Polymer Additives," Abstr. 9$^{th}$ European Drag Reduction Meeting, Ravello-Napoli, 1995; and Deutsch, S. et al., "Combined Polymer and Microbubble Drag Reduction on a Large Flat Plate," *Journal of Fluid Mechanics* 556: 309-327, 2006]. Also, Kozlov, Babenko, and Semenov reported that the efficiency of polymer ejection, when used with even an individually poor performing viscoelastic coating, could be significantly enhanced. Similarly, it has been shown that the combined action of riblets and polymer additives yield a level of drag reduction that is greater than the separate effects [Koury, E. and Virk, P. S., "Drag Reduction by Polymer Solutions in Riblet-Lined Pipes," Abstracts 8$^{th}$ European Drag Reduction Working Meeting, Lausanne, Switzerland 1993]. Thus, if the negative environmental effects of fibers and the difficulties associated with the development and maintenance of a drag-reducing viscoelastic coating could be overcome, these techniques not only would offer a practical method of modest friction drag reduction, but also when used in combination with the Toms Effect (the ejection of a dilute aqueous solution of polymer), it is apparent that the integrated system would be both more effective and more efficient than polymer ejection by itself.

Polymers used in drag reduction, such as polyethylene oxide (PEO), are known to form adsorption entanglement layers while in contact with or flowing over a surface [Barham, P. et al., "Adsorption-entanglement Layers in Flowing High Molecular Weight Polymer Solutions III. Solution Concentration and Solvent Power," *Colloid & Polymer Science*, 264(6): 515-521, 1986; Hand, J. H. and Williams, M. C., "The Adsorbed-entangled Layer in Drag Reduction," *Chemical Engineering Science*, 28: 63-68, 1973; and Kowalski, T., "Turbulence Suppression and Viscous Drag Reduction by Non-Newtonian Additives," *Transactions of the Royal Institution of Naval Architects*, 207-219, 1968]. The factors that control the formation and growth of adsorption-entanglement layers include the chemical nature of the surface at which the layers form, the polymer solution concentration, the molecular weight of the polymer, the solvent power, the temperature, and the rate of the flow over the surface. Specifically, with increased molecular weight, increased concentration, better solvents, and increased flow rates (e.g., higher vessel speed), the layers formed more rapidly and tended to grow thicker [Barham, P. J., "A Quantitative Model for the Formation of Adsorption-entanglement Layers," *Colloid & Polymer Science*, 265(7): 584-591, 1987; and Dijt, J. C. et al., "Kinetics of Adsorption and Desorption of Polystyrene on Silica from Decalin," *Macromolecules* 27: 3207-3218, 1994]. Since an aqueous salt solution is a good solvent for PEO, a rather extended layer can be expected in a saltwater environment [Jones and Richards, *"Polymers at Surfaces and Interfaces,"* Cambridge University Press, 1999]. This phenomenon is well understood in the fields of colloid and polymer science, particularly in the areas of research and industry where the behavior of polymers at surfaces and interfaces are of interest. The early reports by Kowalski (external flow) and Hand and Williams (internal flow) were almost immediately challenged, at least in part by key leaders in the drag reduction community [Kowalski, T., "Turbulence Suppression and Viscous Drag Reduction by Non-Newtonian Additives," *Transactions of the Royal Institution of Naval Architects*, 207-219, 1968 (see the appended written discussions at pages 216-219 by G. E. Gadd, A. G. Fabula, B. Latto and C. H. Shen); and Gyr, A. and, Mueller A., "The Effect of Wall Absorption on the Toms Effect," *Chemical Engineering Science* 29: 1057-1060, 1974]. The lack of acceptance of polymer adsorption onto surfaces for external flows can be attributed to several factors. During laboratory tests with scale models or flat plates in water tunnels, the test runs are of short duration, often less than a minute. The short test periods are to ensure that the background level of polymer does not build up and bias the test results. Also, to inhibit any background buildup, the tunnel is run at high speed after the short test periods and often with sufficient levels of chlorine to "degrade" the polymer in solution. Thus, in addition to limiting opportunity for adsorption, the effect of the added chlorine and high-speed flushing of the tunnel would inhibit the adsorption process. Reviews of Kowalski's work overlooked the fact that he had an open rather than a recirculating test facility. Thus, the flow could be continuous with no concern for previously ejected polymer contaminating the incoming flow. Kowalski ran his tests for extended periods without intentionally trying to "flush" his test apparatus. He also conducted tests on a small craft in open water. Second, and also of critical importance, Kowalski was apparently the first to use a very shallow angled (five degrees to the surface) ejector slot. He demonstrated that such a shallow ejection angle greatly reduced the diffusion rate of the ejected polymer away from the surface. The importance of this ejector feature in reducing the diffusion rate was later quantified by Vdovin and Smol'yakov (1978 and 1981). Later at-sea tests were also limited to just two to five minutes in duration. This duration limit of two to five minutes was because of the large expenditure rates required by inefficient ejectors that required very large volumes of polymer slurry. The usual concentration for a slurry was 10,000 wppm (weight parts per million), which equates to just one part polymer to 99 parts water by weight. Thus, the volume of slurry required for just a few minutes of test dictated that individual tests be short in duration if more than a few conditions were to be evaluated. The series of at-sea tests conducted by Moore et al. [Moore, K. J. et al., "Design and Test of a Polymer Drag Reduction System on Sea Flyer," presented at the 26$^{th}$ Symposium on Naval Hydrodynamics, Rome, Italy, 17-22 Sep. 2006] employed an on-demand polymer make-down (mixing and activating, i.e., uncoiling the polymer molecules) system using seawater. This on-demand system, coupled with the Cortana fluidics ejector, reduces the storage volume and expenditure requirements, thus enabling near-continuous testing. Over the course of each day, individual test runs extended over periods of ten to 45 minutes allowing multiple individual tests to be conducted over the course of one day. Hence, unlike water tunnel and previous at-sea tests, low expenditure rates, tangential ejection, and sufficient time provided the conditions necessary for the establishment of adsorption entanglement layers. It is also known that the flow of polymer solution under a varying tangential shear stress will cause deformation of adsorbed PEO layers. Churaev et al. report that the hydrodynamic thickness of the adsorbed layers can be changed by a factor of two or more for shear stress values expected for a 30-knot ship. The changes in thickness are not caused by desorption (a term used in the related literature), which requires an extended time. Under shear stress, the adsorption layers deform quickly but reversibly and the PEO adsorption layers behave as viscoelastic bodies [Churaev, N. V. et al., "Hydrodynamic Thickness and Deformation of Adsorbed Layers of Polyethylene Oxides," *Journal of Colloid and Interface Science* 169: 300-305, 1995]. The process of deformation has the effect of compressing and consolidating the adsorbed layers. Hence, one can expect the viscoelastic properties of the layers to change as a function of the adjustments in shear stress; that is, the viscoelastic properties will modulate due to the adjustments in vessel speed in terms of both magnitude and frequency of the changes. Also, if gas microbubbles are to be used in combination with polymer ejection and the establishment of adsorption entanglement layers, the presence of microbubbles could result in air being entrained in the layers. If the coating is just being established and gas microbubbles are entrained as the coating is being formed, the density of the coating as well as its viscoelastic properties will be modified. The modification produced by entrained air was observed to degrade the overall drag-reducing performance beginning several minutes after gas ejection was initiated and continued for up to tens of minutes after gas ejection was stopped. However, for more established coatings, system degradation during and after gas ejection was not observed. Thus, relaxing the shear stress on the coatings that are being formed, by measurably slowing or stopping the vessel, can release entrained gases, and returning to speed will again compress and consolidate the coating without reduced entrained materials.

Further, using Fourier transform infrared spectroscopy, it has been shown that, in the presence of a flow field, the backbone of the polymer chain becomes oriented in the direction of the flow, even at low shear rates [Frantz, P. et al., "Orientation of Adsorbed Polymer in Response to Shear Flow," *Colloids and Surfaces A: Physicochemical and Engineering Aspects* 86: 295-298, 1994]. Thus, the character of the adsorbed viscoelastic layer, when produced in a flow field, is anisotropic in the direction of flow. In general, a large number of long molecules can be bound to the surface. They may form large "loops" that extend out into the solution and are separated by "trains" that are physically adsorbed, as well as long "tails" that trail back into the solution. These tails are sometimes referred to as "brushes," which can become dense as they trail out into the flow field. Thus, as the flow continues, the coating can grow by entanglement of free flowing molecules with previously established molecules having loops and tails.

It is also well known that polyethylene oxide (PEO) surfaces are strongly resistant to protein and other biomolecule adsorptions [Harris, J. M. and Zalipsky, S. (Editors), Poly(ethylene glycol) Chemistry and Biological Applications, ACS Symp. Ser. 680, American Chemical Society, Washington, D.C., 1997]. A film of PEO is used as a surface protector to reduce protein adsorption and cell adhesion in medical implants, biosensors, and diagnostic devices [Biederman, Hynek (Editor), Plasma Polymer Films, Imperial College Press, London, pp. 237-239, 338-340, and 357-361, 2004]. The ability of PEO film to inhibit cell adhesion so as to prevent the formation of microbial slimes that produce drag and allow barnacle and tubeworm macrofouling to occur has been observed by the present inventors.

To produce an anisotropic viscoelastic coating efficiently and effectively, both the concentration of high molecular weight polymer solutions along the wall and in the free stream (having a velocity $U_\infty$) should be sufficiently high to ensure a high probability of adsorption entanglement on the wall. Ejection techniques that direct the ejected polymer out into the stream, rather than tangent or nearly tangent to the wall, will enhance diffusion of the polymer away from the near-wall region. [Vdovin, A. V. and Smol'yakov, A. V., "Diffusion of Polymer Solutions in a Turbulent Boundary Layer," *Journal of Applied Mechanics and Technical Physics* 19 (2), 196-201, 1978; and Vdovin, A. V. and Smol'yakov, A. V., "Turbulent Diffusion of Polymers in a Boundary Layer," *Journal of Applied Mechanics and Technical Physics* 22 (4), 526-531, 1981]. On the other hand, an ejector that directs the ejected polymer along the vessel wall (i.e., the vessel hull) without introducing unsteadiness will contribute to the suppression of turbulent diffusion and will ensure that high concentrations of the ejected material remain close to the wall, thereby increasing the potential to establish adsorption-entanglement layers. The ability to produce a tangential ejector using straight slot techniques in the past had presented structural, spatial, and fabrication challenges. However, such a shallow angle ejector (about five degrees to the flow surface) has been demonstrated to produce very short-lived (i.e., on the order of minutes) adsorbed layers [Kowalski, T., "Turbulence Suppression and Viscous Drag Reduction by Non-Newtonian Additives," *Transactions of the Royal Institution of Naval Architects* 207-219, 1968]. Since that test arrangement involved no recirculation but continuous replenishment of the free stream fluid, it is apparent that the observed adsorption was the result of only ejected polymer and not the long-term buildup of an ambient or "background" concentration of polymer in the flow field. More recently, at-sea experiments with the Cortana Corporation fluidics ejector [Moore, K. J. et al., "Method and Apparatus for Increasing the Effectiveness and Efficiency of Multiple Boundary Layer Control Techniques," U.S. Pat. No. 6,357,374 B1, which issued 19 Mar. 2002] demonstrated the feasibility of establishing longer term and operationally practical adsorption entanglement layers on an operational vessel. By ejecting tangentially and avoiding the local increase in turbulence traditionally associated with additive ejection, this ejection technique retards the rapid diffusion of the additive across the boundary layer.

The present inventors have determined that tangential ejection of a concentration $C_i$ of just 1,000 to 1,500 wppm of PEO WSR-310 at flow rates of 5 to 10 times the flow through the viscous sublayer (i.e., $Q_i=5Q_s$ to $10Q_s$) is adequate to establish adsorbed layers in the order of tens of minutes. Once the adsorbed coating is established, the expenditure rate (i.e., the product of concentration $C_i$ times the flow rate $Q_i$) could be reduced substantially (namely, by a factor of more than two) relative to the initial rate with an uncoated hull and still achieve the same level of drag reduction. Hence, much more modest quantities of additive now support extended periods of drag reduction. Further, the ability to mix additives, such as polymer, on demand with seawater [Moore, K. J. et al., "Design and Test of a Polymer Drag Reduction System on Sea Flyer," presented at the 26th Symposium on Naval Hydrodynamics, Rome, Italy, 17-22 Sep. 2006] has eliminated the need to carry the additive in fresh-water mixed slurry form and permits the polymer to be mixed and ejected in an aqueous salt solution.

With regard to the environmental impact, the weight expenditure of polymer relative to the weight of fuel saved for a given vessel depends on the amount of drag reduction, the speed of the vessel, and the portion of friction drag relative to total drag. Since the expenditure rate of polymer, with a proper ejector, is linear with speed and the expenditure rate of fuel is approximately cubic with speed, the benefit of polymer drag reduction increases with vessel speed. For well-designed, high-speed vessels operating over 30 to 35 knots, such as large multi-hull ferries, the ratio of fuel saved to polymer expended is on the order of 10:1. When a simple fuel such as octane $C_8H_{18}$ is burned, it can produce a number of noxious gases, water, and of course carbon dioxide ($CO_2$). The oxidation of a kilogram of octane produces just over three kilograms of carbon dioxide. Polymer naturally degrades into water and carbon dioxide. In seawater, because of the presence of salts, the degradation process has been observed to proceed rapidly after just several tens of minutes. However, that process produces only about two kilograms of carbon dioxide for each kilogram of polymer oxidized. Consequently, oxidation of one kilogram of octane can be expected to produce more than 50 percent more carbon dioxide than the oxidation of one kilogram of PEO. Since the ratio of the weight of fuel saved to the weight of polymer expended is on the order of 10, the $CO_2$ emissions that would have been generated by the fuel saved are reduced by a factor of about 15 (i.e., the $CO_2$ emissions would be about 93% the amount they otherwise would have been). Thus, if the overall vessel drag were reduced by 30 percent, this would equate to a roughly a 30% reduction in fuel burned, and thus a reduction of about 28% in $CO_2$ emissions would be realized.

BRIEF SUMMARY OF THE INVENTION

The present invention is a method for establishing a drag-reducing viscoelastic coating on a marine or industrial surface for the purpose of either providing low levels of friction drag reduction with very low or even intermittent polymer expenditures or providing high levels of friction drag reduction with significantly reduced polymer expenditure rates relative to traditional polymer ejection systems. The method will first be described in general terms. First, a drag-reducing polymer, which is water soluble and nonionic, is combined with a fluid that is characterized as a good solvent, such as fresh water or seawater, to form a concentrated (e.g., on the order 1,000 wppm) solution of the polymer (herein the concentrated solution will be termed the "first fluid"). The properly concentrated first fluid is then ejected tangentially into a boundary layer of the second fluid, as the second fluid flows over a surface, in a manner that avoids rapid diffusion of the polymer across the boundary layer of the second fluid. The velocity of the second fluid can be controlled (for example, by changing vessel speed) to ensure the probability that a large number of ejected polymer molecules come in contact first with the surface and then with adsorbed layers on the surface so as to establish the drag-reducing viscoelastic coating within the desired time. As the first fluid streams over and contacts the surface, the long-chain polymers establish a film-like coating on the surface. Because the polymer is deposited onto the surface while flowing over the surface, the polymer molecules, due to their extreme aspect ratio, favor a longitudinal orientation so that the resulting film is structured and anisotropic in the direction of flow. It is also continuous along the surface such that undesirable transverse edges are avoided. In addition to being anisotropic and having an approximately continuous surface, the thickness of the resulting coating, its transverse structure, and its density satisfy the requirements for a well-posed, drag-reducing coating. Further, when polymers, such as PEO, form brush-like structures, the coating tends to behave as a system of polymer, fibers, and riblets. By increasing the shear stress, the adsorbed layers can be compressed and consolidated. Thus, during the deposition process, the shear stress should be altered, e.g., the vessel slowed to release entrained gases and thereby control the density and viscoelastic properties of the entangled adsorbed layers. Because of the nature of the coating and the turbulent flow field, the film surface is in a cyclical process of deposition (adsorption) and ablation (desorption). Depending on the ejection rate, the polymer can be in a deposition condition, in an equilibrium condition such that the deposition rate is approximately equal to the ablation rate, or in an ablative condition. As when polymer additives are used with coatings, riblets, or fibers, the expenditure rate of the polymer necessary to achieve a specific level of drag reduction is greatly reduced relative to the rate required for short periods of ejection over a rigid surface. Full-scale tests at sea have demonstrated that, in the ablative condition, that is, without continued ejection or with reduced ejection, the film can reduce the friction drag on the order of ten percent.

DETAILED DESCRIPTION

The present invention relates to a method for establishing a drag-reducing viscoelastic coating on a marine or industrial surface. The method includes the following steps, performed in the order indicated, but not necessarily in sequential order:

(a) mixing a polymer with a solvent into a concentrated solution to produce a first fluid that has approximately the same density as a second fluid that flows over a surface, the friction drag of the second fluid flowing over the surface being desired to be reduced;

(b) ejecting the first fluid formed in step (a) into the second fluid flowing over the surface in a manner that does not enhance diffusion of the ejected first fluid across the fluid flow boundary layer of the second fluid as the second fluid flows over the surface, with the ejecting of the first fluid being at a concentration and an ejection rate such that a coating of polymer is adsorbed onto the surface and the coating of polymer initially grows thicker with time; and (c) performing at least one of ceasing ejection of the first fluid formed in step (a) into the second fluid or injecting the first fluid formed in step (a) into the second fluid at a rate such that the coating of polymer grows thinner with time.

During the step (b), one or more of the concentration of the first fluid, the ejection rate of the first fluid, and the velocity of the second fluid may be controlled so as to control the adsorption rate of the polymer to the surface so as to establish a polymer adsorption entanglement layer in a desired time period. Moreover, during step (b), the shear stress on the polymer adsorption entanglement layer optionally may be relaxed one or more times to control the potential entrainment of gases or other materials and consolidate the resulting polymer adsorption entanglement layers. Still further, after the shear stress on the polymer adsorption entanglement layer(s) has(have) been relaxed, the first fluid may be ejected at a rate that achieves a coating equilibrium state during which the ablation rate of the polymer from the surface is balanced by the deposition rate of polymer onto the surface. However, the coating equilibrium state may be made arbitrarily short (i.e., it may be only momentary).

The above steps (a)-(c) may be repeated so that a desired minimal polymer coating thickness is maintained over an extended period of time.

What is claimed is:

1. A method for reducing polymer expenditure rates by establishing a drag-reducing viscoelastic coating on a marine or industrial surface, said method comprising the following steps, performed in the order indicated, but there may be intervening steps:

(a) mixing a polymer with a solvent into a concentrated solution to produce a first fluid that has approximately the same density as a second fluid that flows over a surface, the friction drag of the second fluid flowing over the surface being desired to be reduced;

(b) tangentially ejecting the first fluid formed in step (a) into the second fluid flowing over the surface in a manner that does not enhance diffusion of the ejected first fluid across the fluid flow boundary layer of the second fluid as the second fluid flows over the surface, with the ejecting of the first fluid being at a concentration and an ejection flow rate such that a coating of polymer is adsorbed onto the surface and the coating of polymer initially grows thicker with time, and further including temporarily relaxing the shear stress on the adsorbed coating of polymer one or more times by reducing the free stream velocity $U_\infty$ of the second fluid in order to control the potential entrainment of gases or other materials and to consolidate the resulting polymer adsorption entanglement layer(s); and (c) reducing the ejection rate of the first fluid such that the polymer adsorption entanglement layers become thinner with time;

wherein, during step (b), one or more of:
   the concentration $C_i$ of the first fluid,
   the ejection rate $Q_i$ of the first fluid, and
   the free stream velocity $U_{28}$ of the second fluid are controlled so that the coating of polymer is adsorbed onto the surface within a desired time period.

2. The method as set forth in claim 1, wherein, after the shear stress has been relaxed, the first fluid is ejected at a concentration and a rate that achieves a coating equilibrium state during which the ablation rate of the polymer from the surface is balanced by the deposition rate of polymer onto the surface.

3. The method as set forth in claim 2, wherein the coating equilibrium state is made arbitrarily short so that the duration of there being an equilibrium state is only momentary.

4. The method as set forth in claim 1, wherein said steps (a) to (c) thereof are repeated one or more times so that a desired minimum coating thickness is maintained over an extended period of time.

* * * * *

UNITED STATES PATENT AND TRADEMARK OFFICE
CERTIFICATE OF CORRECTION

| | | |
|---|---|---|
| PATENT NO. | : 8,039,055 B2 | Page 1 of 1 |
| APPLICATION NO. | : 11/968573 | |
| DATED | : October 18, 2011 | |
| INVENTOR(S) | : Moore et al. | |

It is certified that error appears in the above-identified patent and that said Letters Patent is hereby corrected as shown below:

At col. 12, line 11, change "$U_{28}$" to -- $U_\infty$ --.

Signed and Sealed this
Twelfth Day of June, 2012

David J. Kappos
*Director of the United States Patent and Trademark Office*